United States Patent [19]
Oleszko et al.

[11] Patent Number: 4,721,279
[45] Date of Patent: Jan. 26, 1988

[54] FOAM MOLD EQUIPPED WITH A SELF-CLEANING MOLD VENT ASSEMBLY

[75] Inventors: Mark A. Oleszko, Warren; Angelika J. Coyle, Utica; Richard S. Draganski, Troy; Darryl Marbury, Madison Heights, all of Mich.

[73] Assignee: General Motors Corporation, Detroit, Mich.

[21] Appl. No.: 866,974

[22] Filed: May 27, 1986

[51] Int. Cl.$^4$ .................. B29C 33/10; B29C 67/20
[52] U.S. Cl. ..................... 249/141; 249/96; 249/170; 425/812; 425/817 R; 425/85; 425/546
[58] Field of Search ............ 249/141, 84, 96, 97, 249/170; 425/812, 817 R, 85, 546; 164/372, 410

[56] References Cited

U.S. PATENT DOCUMENTS

| 1,983,976 | 7/1933 | Garvey, Jr. | 425/812 X |
|---|---|---|---|
| 2,926,385 | 3/1960 | Willson, Jr. | 425/812 X |
| 3,143,770 | 8/1964 | Jeske | 249/141 |
| 3,160,928 | 12/1964 | Smillie | 425/812 X |
| 3,230,590 | 1/1966 | Schaible et al. | 425/812 X |
| 3,291,873 | 12/1966 | Eakin | 249/141 |
| 3,329,198 | 7/1967 | Manning et al. | 425/812 X |
| 3,804,566 | 4/1974 | Kimura et al. | 425/28 |
| 4,165,062 | 8/1979 | Mitchell | 249/141 |
| 4,208,177 | 6/1980 | Allen | 425/812 X |
| 4,422,840 | 12/1983 | Posch et al. | 425/812 X |
| 4,436,497 | 3/1984 | Dahl et al. | 425/28 R |
| 4,579,700 | 4/1986 | Cavender | 249/170 |

Primary Examiner—Jay H. Woo
Assistant Examiner—James C. Housel
Attorney, Agent, or Firm—Randy W. Tung

[57] ABSTRACT

A foam mold equipped with a self-cleaning mold vent assembly constructed of a rigid apertured plate member and a sacrificial filter member for molding a unitary foamed article.

2 Claims, 7 Drawing Figures

FOAM MOLD EQUIPPED WITH A SELF-CLEANING MOLD VENT ASSEMBLY

This invention generally relates to a foam mold equipped with a self-cleaning mold vent assembly for molding a unitary foamed article and, more particularly, relates to a foam mold equipped with a self-cleaning mold vent assembly constructed of a rigid apertured plate member and a sacrificial filter member for molding a unitary foamed article.

BACKGROUND OF THE INVENTION

Automobile seats typically include a seat portion and a back portion molded of flexible urethane foam material. A typical process used in molding these seating foam buns is by pouring urethane precursors into an open mold and then closing the mold to allow foaming reaction and curing of the foam bun. During the foaming reaction, urethane precursors react to expand into a cellulosic structure filling the mold cavity while exhausting the air inside the mold cavity to the outside atmosphere at the same time. The evacuation of air entrapped in the mold cavity is an important step of the foam bun manufacturing process. Without an efficient air venting method, foam buns having voids and non-uniform density distribution are produced which must be scraped.

Traditionally, entrapped air in a mold cavity is evacuated to the outside atmosphere through vent holes drilled at predetermined locations in the mold. These vent holes are of a very small diameter, i.e. between 1/32 and 1/16 in., and must be strategically located such that efficient air evacuation may occur. Vent holes not placed at the correct location often lead to imperfections in the foam bun such as voids and air bubbles. The size of the vent holes are also critical since they must be large enough to allow rapid evacuation of air and small enough such that no significant amount of foam material may escape to the outside of the mold. Mold venting has been largely a trial-and-error technique which requires many tedious steps of drilling holes of different diameters at different locations before an optimum combination of vent hole locations and vent hole diameters could be found.

Moreover, when small vent holes are used, urethane foam flows into the vent holes forming flash both inside and outside the hole. The formation of urethane foam flash outside the mold sometimes is referred to as vent buns in the shape of a mushroom. These excess foam flash must be removed from the surface of the foam bun after molding which requires extensive labor. As a consequence, these vent holes must be cleaned frequently to remove foam material plugging the vent holes. More labor is involved in cleaning vent holes and spraying mold released into the vent holes to facilitate removal of foam flash.

It is, therefore, an object of the present invention to provide a foam mold equipped with a single self-cleaning mold vent assembly such that a large number of vent holes need not be drilled into the mold.

It is another object of the present invention to provide a foam mold equipped with a self-cleaning mold vent assembly which allows rapid evacuation of entrapped air in the mold cavity.

It is a further object of the present invention to provide a foam mold equipped with a mold vent assembly which does not require any cleaning process after each molding operation.

SUMMARY OF THE INVENTION

In accordance with a preferred practice of my invention, a foam mold equipped with a self-cleaning mold vent assembly may be constructed as follows. The upper mold half of a foam mold is designed with a vent hole having a suitable diameter and a countersunk hole having a diameter slightly larger than that of the vent hole from the underside of the upper mold half. This concentric hole arrangement provides a means to receive a rigid apertured support plate member and a filter member by compression fit.

The rigid apertured support plate member is normally a quarter inch thick disc approximately two inches in diameter and perforated with a multiplicity of holes to allow air evacuation. In operation, this rigid apertured support plate member stays inside the countersunk hole in the upper mold half and serves as a support base for the filter member.

The filter member is normally a porous element such as foam or paper which performs the dual functions of maintaining a minimal intra-mold pressure during the foaming operation by allowing large amounts of air to escape through the vent, and then forming a complete seal when contacted by the rising foam. The filter member is adhered to and demolded with the foam bun at the end of each molding cycle. Since the flow of foam is completely stopped by the filter member, the apertured plate member is never contaminated by the foam material. Therefore, a completely self-cleaning mold vent system is achieved. A new filter member is re-inserted into the countersunk hole in the upper mold lid at the start of the next foaming cycle.

BRIEF DESCRIPTION OF THE DRAWINGS

This and other objects, features, and advantages of the invention will become apparent upon consideration of the specification and the appended drawings, in which.

DETAILED DESCRIPTION OF THE PREFERRED EMBODIMENT

Figure 1:
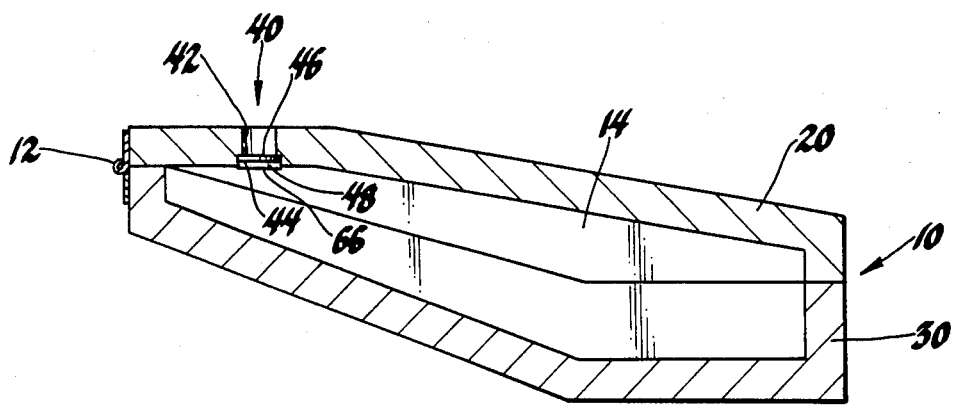
FIG. 1 is a cross-sectional view of a foam mold equipped with a self-cleaning mold vent assembly.

Referring initially to FIG. 1, a cross-sectional view of a foam mold 10 is shown. Foam mold 10 consists of an upper mold half 20 and a lower mold half 30 connected by a hinge member 12 such that the two mold halves may be operated pivotally. Mold 10 is equipped with a self-cleaning mold vent assembly 40. The self-cleaning mold vent assembly 40 is constructed of a vent hole 42 drilled in the upper mold half 20, a countersunk hole 44 drilled from the inner surface of upper mold half 20, a rigid apertured support plate member 46, and a sacrificial filter member 48.

Figure 2:
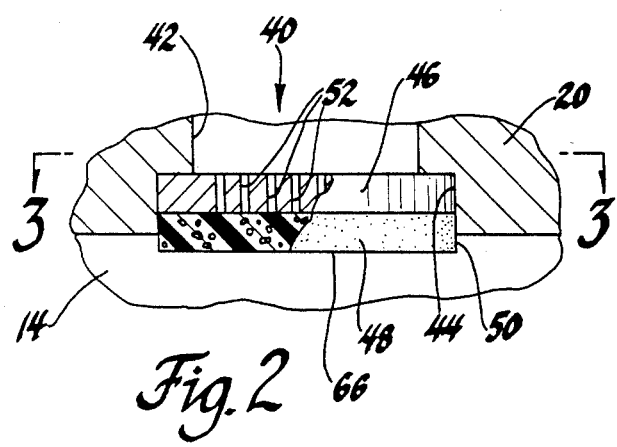
FIG. 2 is an enlarged fragmentary portion of FIG. 1 showing the mold vent assembly in detail.

FIG. 2 shows an enlarged fragmentary view of the mold vent assembly 40. We have found that a suitable size of vent hole 42 in a mold for an automotive bench seat foam bun, i.e., a relatively large piece of foamed article, is 1½ in. diameter. A suitable size for the countersunk hole 44 on the inner surface of the upper mold half 20 is approximately 2 in.. A suitable depth of the countersunk hole was found to be approximately ⅜ in. such that a ¼ in. support plate member 46 may be press fitted into countersunk hole 44 and a sacrificial filter member 48 may also be press fitted into hole 44 against the support plate member 46. The edges 50 of the sacrificial filter member 48 is partially exposed into the mold cavity 14 such that filter member 48 is encased in a foam bun after a foaming operation. This encasement of filter member 48 into a foam bun facilitates the removal and the separation of filter member 48 from upper mold half 20 and the rigid support plate member 46. A completely clean separation between the support plate member 46 and the filter member 48 is desirable to achieve the self-cleaning purpose of the mold vent assembly 40.

Figure 3:
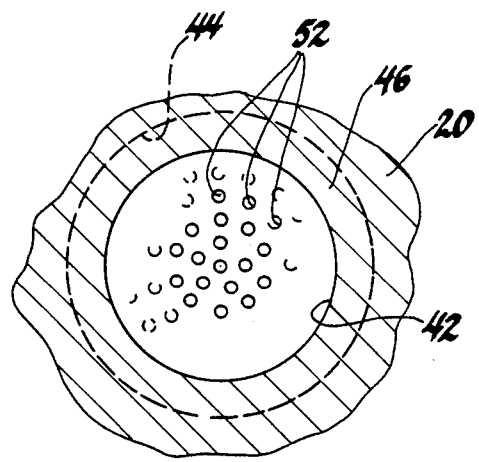
FIG. 3 is an enlarged view taken along line 3—3 in FIG. 2.

FIG. 3 is a top view taken along line 3—3 in FIG. 2. The rigid apertured support plate member 46 can be made of any rigid material. We have found a suitable material to use is aluminum. A multiplicity of holes 52 were drilled in the support plate member 46 to allow air passage. The size of holes 52 was approximately 1/16" diameter and as many holes as possible were drilled.

While any rigid material may be used for the apertured plate member 46, any filter material having suitable porosity may also be used for the sacrificial filter member 48. For instance, filters made of paper, fiberglas, and foam may all be suitable for such purpose. One of such materials we have used is a polyester urethane foam material designated as Scottfelt ® #4-900Z supplied by Scotfoam of Eddystone, Pennsylvania. This specific grade of foam filter material has a density of 6.6 lbs/ft$^3$ and a cell size of approximately 90 per linear inch. This foam filter material is die cut into desired size for use in our mold vent assembly. An important property requirement for the foam filter material is that the air flow rate must be in the range between 80 to 200 ft$^3$/ft$^2$/min.. The foam filter must allow a minimum air flow of 80 ft$^3$/ft$^2$/min. such that all the entrapped air in the mold cavity may be rapidly evacuated out of the mold. We have also discovered that it is desirable to limit the air flow rate below a maximum range of 200 ft$^3$/ft$^2$/min. such that foam material does not penetrate through the foam filter to contaminate the apertured support plate member.

Figure 4:
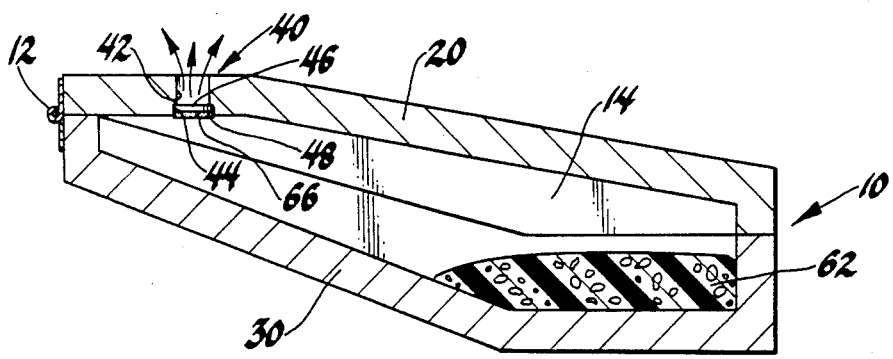
FIG. 4 is a cross-sectional view of the foam mold immediately after the pouring of foam chemical and closing of the upper mold lid.
Figure 5:
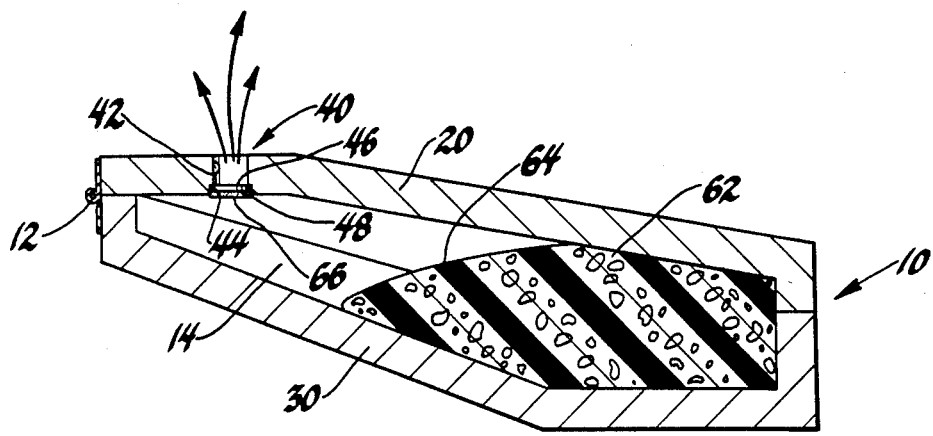
FIG. 5 is a cross-sectional view of the foam mold showing the rising of the foam material.
Figure 6:
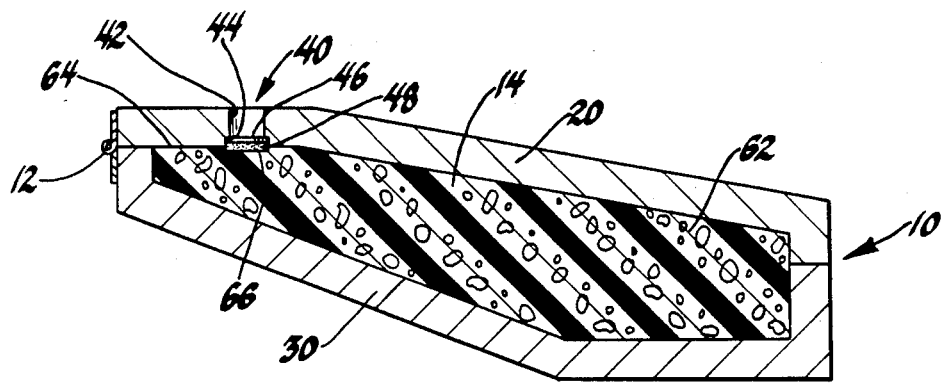
FIG. 6 is a cross-sectional view of the foam mold showing the mold cavity completely filled with the foam material.

FIGS. 4, 5, 6 and 7 illustrate the sequential operation of a foam molding process. FIG. 4 is a cross-sectional view of a foam mold showing the foam chemical precursors 62 just being poured into the lower mold half and the mold closed. The foaming reaction of the foam chemical precursors 62 started immediately, as shown in FIG. 5, and the advancing foam front 64 rapidly pushing entrapped air out of vent hole 42. As the foam front 64 further advances, as shown in FIG. 6, mold cavity 14 is completely filled with foam material 62. As soon as the foam front 64 meets the surface 66 of the foam filter member 48, foam material 62 fills the cells in filter member 48 and thus providing a complete seal of the foam mold cavity from the outside atmosphere.

Our novel self-cleaning mold vent assembly performs three important functions. First, it allows the rapid evacuation of entrapped air in a mold cavity during the foaming reaction of the foam material. This rapid evacuation of air enables a minimal intra-mold pressure being maintained during the foaming reaction. This minimal intra-mold pressure in turn leads to a foam bun having more uniform density. Moreover, the usage of a smaller amount of blowing agent is also possible. Secondly, our novel self-cleaning mold vent assembly enables the complete sealing of the mold cavity from the outside atmosphere as soon as the expanding foam front meets the surface of the filter member. This facilitates a more uniform and faster cure of the foam material. Thirdly, the sacrificial foam filter member prevents the foam material from further penetrating into the rigid support plate and the vent holes. Therefore, no contamination of the vent holes could occur and no cleaning is necessary. Another added benefit is that our novel self-cleaning mold vent assembly allows the convenient location of one vent hole on top and normally at the highest point of the upper mold half, instead of using a multiplicity of small vent holes which requires extensive machining and also cleaning after each molding cycle.

Figure 7:
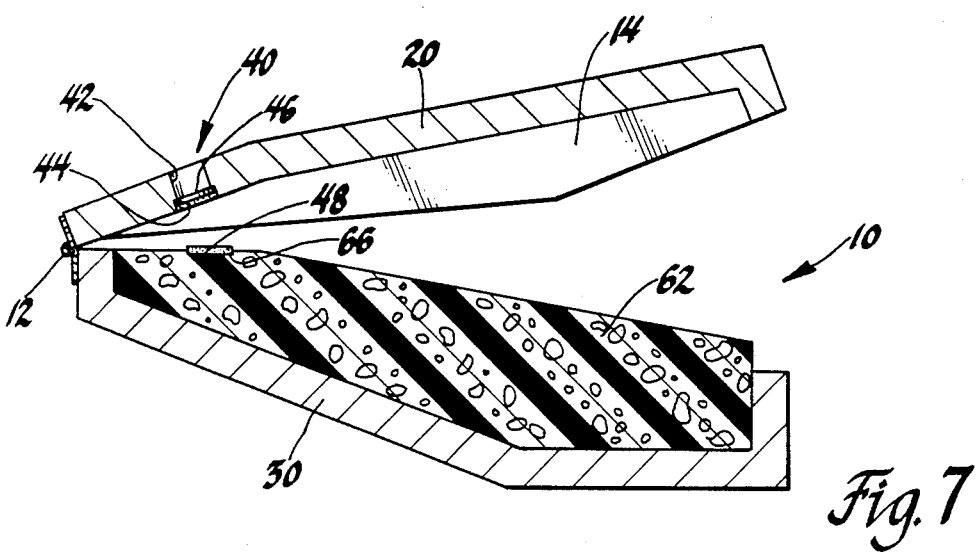
FIG. 7 shows a cross-sectional view of the foam mold at the end of the molding cycle where the foamed article together with the filter member adhered to it ready to be removed from the mold cavity.

FIG. 7 shows the end of the molding cycle where the upper mold half is open. The sacrificial foam filter member 48 is partially encased in foam material 62 around its edges 50. This encasement allows the automatic removal of the foam filter member from the mold vent assembly 40. A new filter may then be inserted into the mold vent assembly 40 for use in the next molding cycle. Sacrificial foam filter member 48 may be left with foam material 62 in the foam bun as part of the foamed article or may optionally be removed.

While our invention has been described in terms of a preferred embodiment thereof, it is to be appreciated that those skilled in the art would readily apply these teachings to other possible variations of the invention.

We claim:

1. A mold equipped with a self-cleaning mold vent assembly for molding a unitary foamed article comprising a first mold member sealingly engaging a second mold member for shaping said foamed article, a second mold member coacting with said first mold member in a closed position to define a mold cavity of fixed length and width for shaping said foamed article, said first mold member having a mold wall equipped with a self-cleaning mold vent assembly constructed of a rigid apertured plate member and a sacrificial filter member, said sacrificial filter member disposed against the plate member in a recessed area of the mold wall such that said filter member extends partially beyond the mold wall into the mold cavity, said plate member and filter having a diameter substantially smaller than the length and width of said mold cavity.

2. A mold equipped with a self-cleaning mold vent assembly for molding a unitary foamed article comprising a first mold member sealingly engaging a second mold member for shaping said foamed article, a second mold member coacting with said first mold member in a closed position to define a mold cavity of fixed length and width for shaping said foamed article, said first mold member being equipped with a self-cleaning mold vent assembly mounted in a recessed area defined by a stepped diameter opening facing said cavity, said mold vent assembly being constructed of a rigid apertured plate member and a sacrificial filter member, said filter member extending only partially beyond the opening into the mold cavity, said plate member and filter member having a diameter substantially smaller than the length and width of said mold cavity.

* * * * *